Oct. 17, 1950  K. ALBRECHT  2,525,754
CONDUCTIVITY CELL
Filed Sept. 29, 1948

INVENTOR.
KURT ALBRECHT
BY Zugelter & Zugelter
Attys.

Patented Oct. 17, 1950

2,525,754

UNITED STATES PATENT OFFICE 2,525,754

CONDUCTIVITY CELL

Kurt Albrecht, Pleasant Hills Borough, Pa., assignor to Hall Laboratories, Inc., Pittsburgh, Pa., a corporation of Pennsylvania Application September 29, 1948, Serial No. 51,663

4 Claims. (Cl. 175—183)

This invention relates to electrodes, and more particularly to electrodes known as conductivity cells employed in meters for the measurement of the conductivity of solutions for the purpose of determining the concentration of a salt or chemical therein.

Conductivity cells of the type to which this invention relates usually embody two electrodes which are separated in space from each other by a di-electric having suitable electrical insulating properties. When an electric potential, usually alternating current, is impressed on these electrodes while immersed in a solution, current flows from one electrode to the other, in accordance with the conductivity of the solution, provided the mean path between the electrodes and the surface area thereof remain substantially constant. The current flow at a given potential is a measure of the concentration of a salt or chemical in the solution which will ionize upon being dissolved. Conductivity cells should have substantially constant cell characteristics, but it is difficult to produce cells of a given design having identical or reasonably identical cell characteristics when manufactured in quantity.

An object of this invention is to provide a conductivity cell that will be simple in construction, rugged and durable in operation, and of such design that the cell characteristics of one can be duplicated in others when manufactured in quantity.

Another object of the invention is to provide a conductivity cell that may be readily attached to or mounted in place on existing equipment and that shall have a substantially constant length of current path and substantially constant area of electrodes.

A still further object of this invention is to provide a conductivity cell having a primary electrode that is highly resistant to pitting or deterioration by the solutions in which it is immersed.

A further object of the invention is to provide a conductivity cell in which the surface of the primary electrode that is exposed to the solution, is substantially spherically concave and shrouded by an insulating member in order that the electrode surface may be protected against accumulation of soil thereon carried into the solution and other deposits, which otherwise would adversely affect the operating characteristics of the cell.

A still further object of the invention is to provide a cell that is particularly suitable for use in detergent solutions such as employed in mechanical dishwashers, and dairy can and dairy equipment washers, in that it is sensitive to deviations from a fixed or predetermined specific resistance, such as the specific resistance of a detergent solution of a given or desired concentration.

These and other objects of the invention will be apparent to those skilled in this particular art from the following description taken in conjunction with the accompanying drawings, in which.

Throughout the specification and drawings like reference characters indicate like parts.

Figure 1:
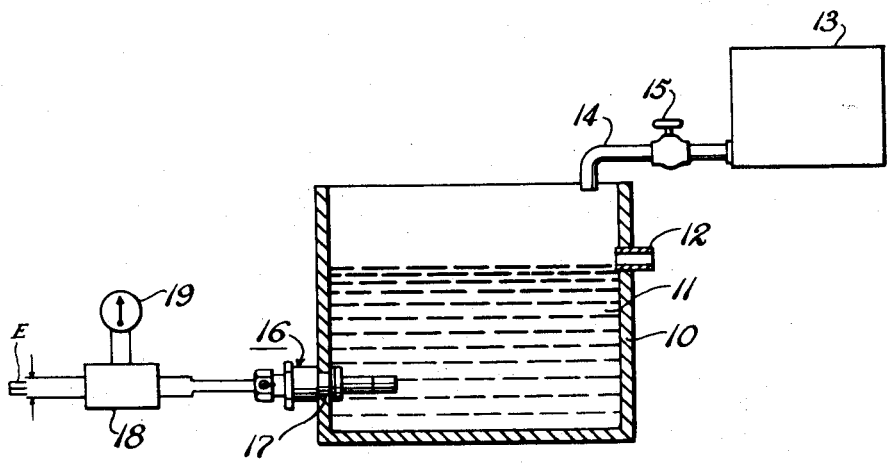
Figure 1 is a more or less diagrammatic view of a tank or container having therein a solution the conductivity of which is to be measured, provided with a conductivity cell embodying a form of the invention, and an electrical unit therefor, by which the conductivity may be measured.

In Figure 1 a tank 10 is shown having therein a solution 11 containing a salt which is soluble in the solution the conductivity of which is to be measured. It is to be understood that liquid such as water is supplied to this tank and that the level thereof is ordinarily maintained constant by providing an overflow 12 through which the liquid flows when the level has reached a predetermined point. The solution 11 may be an aqueous solution of a detergent such as alkali-metal silicate or a highly alkaline phosphate of the ortho-phosphate type. If the solution 11 is diluted with water it will be apparent that its concentration will diminish. Therefore to replenish the solution with detergent a supply tank 13 containing a concentrated solution of the detergent may be provided. Concentrated solution from tank 13 may be delivered to tank 10 through a pipe 14 having a valve 15 thereon.

Tank 10 may, for example, be the detergent tank of a dish-washing machine or other washer. In machines of this type it is desirable for efficiency of cleaning that the concentration of the solution be maintained at a minimum value in order that washing may be properly accomplished. It is also important for economy reasons that the concentration of the detergent not be higher than is necessary, as this would be wasteful.

In order to determine the concentration of salt or detergent in solution 11, a conductivity cell 16, embodying what now appears to be a preferred form of the invention may be employed. The cell is so constructed that it may be inserted through an opening 17 in a wall of the tank and be fastened to it in such fashion that solution cannot leak past the cell unit to the exterior of the tank. Cell 16 may be connected to an electrical unit 18 illustrated only diagrammatically in the drawing designed to provide a means for measuring current flow through the cell. This unit may be connected to a source of service voltage such as 110 volt alternating current, the conductivity cell being connected to the unit so that current will flow through it and the solution. The value of the current flowing through the cell and solution may be measured by a meter 19 associated with unit 18. By calibrating this meter in terms of concentration, the meter will indicate concentration directly provided the temperature of the solution is held constant.

The conductivity cell 16 may be employed in a simple indicating circuit as suggested by Fig. 1, or it may be employed in an electrical circuit having apparatus associated therewith designed to control automatically the flow of detergent from tank 13 into the solution 11, in accordance with departures of the concentration from certain or predetermined values. Such an arrangement is shown in my co-pending application, Serial No. 51,664, filed on even date herewith in the United States Patent Office.

Figure 2:
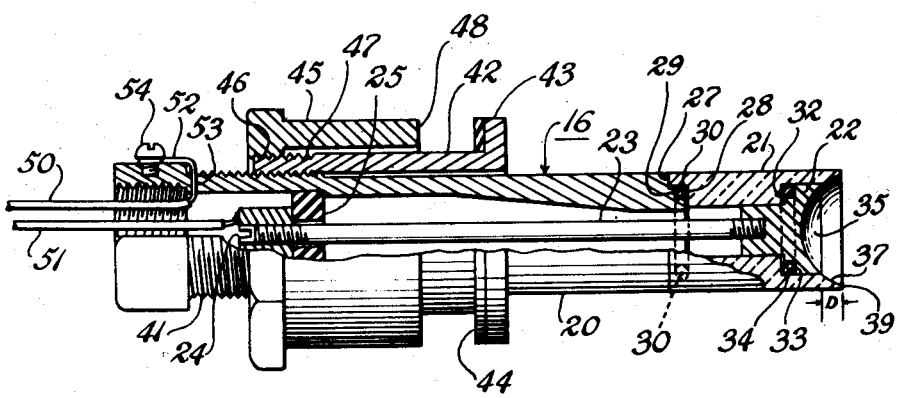
Fig. 2 is an enlarged view partly in section, of the conductivity cell and a fitting by which the same may be inserted through an opening in a wall of the container and clamped in fluid-tight relationship therewith.

The conductivity cell 16 is illustrated in detail in Fig. 2. As there shown, the cell comprises a tubular or cylindrical member 20 made of metal, preferably stainless steel or a metal which will be highly resistant to attack by the solutions in which it will be immersed, an insulating member 21 carried at one end thereof, and a primary or principal metallic electrode 22 disposed within the outer or immersion end of member 21 so as to be shrouded thereby.

The material of which member 21 is made is preferably one that can be machined without developing strain cracks, has the necessary mechanical strength, and is resistant to attack by the solutions in which it is immersed. Synthetic resins having these properties are suitable.

Means are provided for holding members 20, 21 and electrode 22 in tandem as a compactly assembled unit. As shown, these members are held together in tandem by a tie or tension rod 23, a nut 24 and bearing bushing or plate 25, the bushing being made of suitable insulating material. One end of tension rod 23 is threaded into electrode 22 while the opposite end extends through the insulating bushing 25 on which nut 24 is threaded to the extent necessary to hold the component parts 20, 21 and 22 firmly together. In this assembly members 20 and 22 constitute the electrodes, the latter being the primary or principal electrode, and these electrodes are separated and insulated from each other by insulator 21 and bushing 25.

Electrode 22 is seated in a recess formed in member 21, the size and shape of the recess conforming to the size and shape of the electrode so that a neat fit is provided between the contacting surfaces of the recess and the electrode.

In the construction shown, the end of cylindrical member 20, adjacent member 21 is provided with an annular shoulder 27, and the adjacent end of member 21 is counterbored to provide a shoulder 28. Also this end of member 20 is provided with a second annular shoulder 29, on which is received an annular or ring-like gasket 30. Thus when member 21 is fitted onto the end of cylindrical member 20, the gasket 30 forms a fluid-tight joint, when the nut 24 is pulled up tightly.

In order to avoid leakage of fluid past or through the joint between the contacting surfaces of electrode 22 and the recess in outer end of member 21, the outer end of member 21 is provided with an annular shoulder 32, and the electrode is provided with a complementary annular shoulder 33, between which shoulders an annular or ring-like gasket 34 may be clamped to provide a fluid-tight joint.

As may be seen in Fig. 2, the electrode 22 is provided with a spherical concavity 35 which provides an electrode surface having a predetermined area. It is preferred that the wall surface of the recess in the outer end of member 21 adjacent the surface 35 be flared outwardly and spherically curved so as to constitute in effect a continuation of the spherical surface 35. Thus, as may be seen by inspection of Fig. 2, the surfaces 35 and 37 in electrode 22 and member 21 respectively form substantially a half-hollow sphere. It is preferred that insulating member 21 extend beyond electrode 22 a distance D approximately equal to one half the diameter of the electrode, to shroud the electrode surface 35.

The spherical surface 35 in the electrode 22 and the shroud or extension of the insulator 21 beyond this electrode surface causes the electrode to function in the cell assembly consistently and reliably in detergent solutions of dishwashers and dairy washing equipment because the surface 35 stays clean. It is important that soil shall not accumulate on electrode surface 35 and in the recess of insulator 21 in which the electrode 22 is disposed, nor scale form on surface 35. The concave surface 35 and the continuation of that surface in the interior of the portion of insulator 21 extending beyond and shrouding the electrode surface minimizes and prevents substantially the accumulation of soil and scale on the electrode surface.

It is important that the spherical surface 35 of the electrode element 22 be as free of pits and corrosion as possible in order that its total current conducting surface and its resistivity may remain substantially constant under conditions of use. The current path from surface 35 to cylindrical member 20 will therefore be substantially constant. In order that surface 35 of the electrode shall be as free of attack by the solution as possible, particularly when immersed in highly alkaline solutions, it is preferred that electrode 22, and particularly its surface 35, be covered with a tightly adhering thin layer of a precious metal such as gold. The layer may be a precious metal foil or a precious metal film plated on the electrode as by electro-plating. Other plating metals such as platinum, rhodium, silver and other precious metals may be employed, but I have found that gold provides a satisfactory surface where the electrode is to be immersed in highly alkaline solutions.

In order that the conductivity cell may be attached to a container such as illustrated at 10, the end of cylinder 20 opposite insulator 21 may be externally threaded as at 41 to receive a bushing 42 having internal threads that register with threads 41. Bushing 42 is provided with a flange 43 to receive a gasket 44. A cooperating clamp bushing 45 having internal threads 46 registering with external threads 47 on bushing 42 is provided to clamp the container wall between gasket 44 and the adjacent end 48 of bushing 45, thereby to form a fluidtight joint.

When the conductivity cell illustrated is to be mounted in place on a tank or container such as shown in Fig. 1, an opening such as indicated at 17 is cut in the tank of a size sufficient to receive bushing 42. Bushings 42 and 45 are then threaded one into the other, as above described, to ensure a fluidtight joint at the gasket 44, after which member 20 is inserted through bushing 42 and threaded into the internal threads thereof. The electrodes of the conductivity cell may be connected to an electrical unit such as the indicating unit 18 by means of insulated electrical conductors 50 and 51, connected respectively to the threaded end of cylinder 20 and to nut 24.

As shown in Fig. 2, conductor 50 is secured to the outer end of member 20 by inserting a bare end 52 of the wire through a small hole 53 from the inside of member 20 and looping the end of the wire under the head of a screw 54. Conductor 51 is secured to tension nut 24 by soldering the same thereto.

Figure 3:
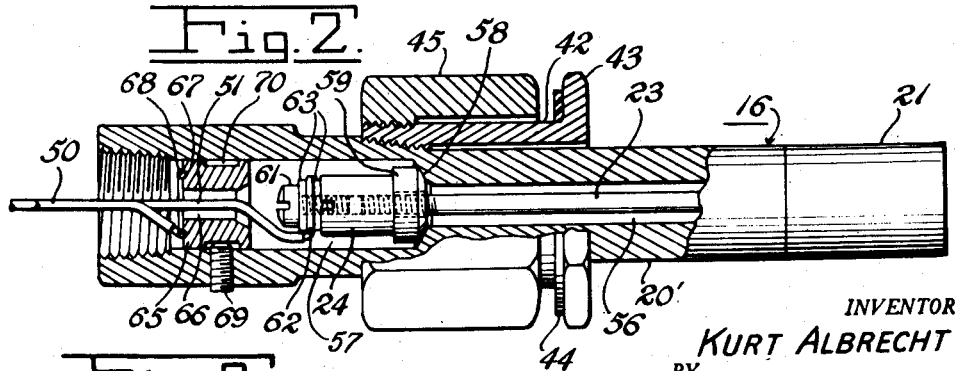
Fig. 3 is a view in section showing a modified construction of the terminal end of the cell.

In Fig. 3 a modified form of construction of the terminal end of the cell is shown. As there illustrated the body portion of member 20' (corresponding to member 20) is provided with a straight bore 56 through which tension on the rod 23 extends. Member 20' is formed with an enlarged bore 57 provided with a conical or tapered seat 58 surrounding the adjacent end of bore 56 to accommodate a bearing member 59 of insulating material. Member 59 is faced to conform with and seat on seat 58 when the tension nut 24 is drawn up tightly on the threads of rod 23.

Conductor 51, instead of being soldered to nut 24, is secured to the nut by means of a screw 61 threaded into the threads thereof. The screw extends through a terminal ring 62 disposed between lock washers 63. Thus terminal 51 is firmly connected to nut 24 and a good electrical connection made to electrode 22.

Connector terminal 50, instead of passing through a hole in member 20 as in Fig. 2 and being secured to the outside of said member by a screw or equivalent, is secured to a plug 65 having a snug fit with the outer end of bore 57. Plug 65 is provided with a central bore 66 to accommodate connector 51 and an annular groove 67 in its outer face for receiving a coiled end 68 of the connector wire. The coiled end 68 is soldered to the nut, preferably over the entire length of the groove so that its attachment thereto will be strong.

Plug 65 is held in place by means of a setscrew 69 that enters a groove 70 when turned to locking position. By means of the setscrew and locking groove, proper positioning of plug 65 with reference to nut 24 is assured, as the plug must not come in direct contact with screw 61 as a short circuit would result.

From the foregoing it will be apparent that the conductivity cell illustrated by the drawings is of simple rugged construction, with the parts thereof so arranged and assembled that the cell may be easily installed, and readily inspected, cleaned, or repaired, as the case may be. It will also be apparent the construction is adapted to quantity production of similar cells having substantially identical cell characteristics.

Having thus described the invention, it will be apparent to those skilled in this art that various modifications and changes may be made in the cell without departing either from the spirit or the scope of the invention as indicated by the appended claims.

What I claim as new and desire to secure by Letters Patent is:

1. A conductivity cell comprising a hollow metallic cylindrical member having at its inner end a cylindrical member of insulating material abutting the metallic member in tandem coaxial relation, said insulating member having at its outer end a recessed cavity, a metal electrode in said cavity and shrouded by the recessed end of said insulating member, and means for holding said electrode, cylindrical and insulating members in assembled relationship, said electrode having a substantially spherically concave surface merging with the wall surface of the cavity in said insulating member, said cell when its electrode end is immersed in a solution, having a conductivity path extending from said substantially spherical surface, about the external surface of said insulating member, to said metallic cylindrical member.

2. A conductivity cell according to claim 1 characterized by the fact that a resilient seal is interposed between the electrode and the walls of the recessed cavity in said insulating member and that another resilient seal is within the exterior surfaces of and interposed between said insulating member and said metallic cylindrical member, whereby fluidtight joints are formed at the location of said seals.

3. A conductivity cell according to claim 1 characterized by the fact that the walls of the recessed end of the insulating member extend beyond the concave surface of the electrode a distance equal to at least one half the diameter of said electrode.

4. A conductivity cell according to claim 1 characterized by the fact that the interior of the metallic cylindrical member is provided with a seat facing the outer end of said cylindrical member, that a tension rod extends through said metallic member and has a threaded connection at its inner end with said electrode, that an insulator embraces the outer end of said rod, said insulator being seated on said seat, and that a threaded nut is turned on the outer end of said rod to force the insulator against said seat and stress said rod to thereby hold the metallic cylindrical member, insulating member and electrode in operative relationship to each other, the outer end of said tension rod and the interior of said cylindrical member being provided with means for connecting the same to electric circuit lead-in conductors.

KURT ALBRECHT.

REFERENCES CITED

The following references are of record in the file of this patent:

UNITED STATES PATENTS

| Number | Name | Date |
|---|---|---|
| 1,592,979 | Keeler | July 20, 1926 |
| 1,774,319 | Crockatt | Aug. 26, 1930 |
| 1,797,817 | Bidwell | Mar. 24, 1931 |
| 1,898,209 | Parker | Feb. 21, 1933 |
| 2,000,668 | Pease | May 7, 1935 |
| 2,437,134 | Smith | Mar. 2, 1948 |